US010043128B2

(12) United States Patent
Lankinen et al.

(10) Patent No.: US 10,043,128 B2
(45) Date of Patent: Aug. 7, 2018

(54) DATA CARRIER

(71) Applicant: GEMALTO SA, Meudon (FR)

(72) Inventors: Mikko Lankinen, Meudon (FR);
Kristian Lappalainen, Meudon (FR);
Teemu Pohjola, Meudon (FR); Jukka
Mösky, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/300,873

(22) PCT Filed: Mar. 13, 2015

(86) PCT No.: PCT/EP2015/055280
§ 371 (c)(1),
(2) Date: Sep. 30, 2016

(87) PCT Pub. No.: WO2015/150052
PCT Pub. Date: Oct. 8, 2015

(65) Prior Publication Data
US 2017/0024639 A1    Jan. 26, 2017

(30) Foreign Application Priority Data
Mar. 31, 2014 (EP) .................................. 14290088

(51) Int. Cl.
G06K 5/00 (2006.01)
G06K 19/18 (2006.01)
(Continued)

(52) U.S. Cl.
CPC ........... *G06K 19/18* (2013.01); *B42D 25/309* (2014.10); *B42D 25/313* (2014.10);
(Continued)

(58) Field of Classification Search
CPC .......... G06K 19/18; G06K 19/10; G07D 7/00; B42D 25/309; B42D 25/313; B42D 25/324; B42D 25/342
(Continued)

(56) References Cited

U.S. PATENT DOCUMENTS 7,830,627 B2 * 11/2010 Commander .......... B41M 3/148
                                                    359/820
8,083,152 B2 * 12/2011 Theodossiou ............ B41M 3/14
                                                    235/380
2011/0209328 A1    11/2011 Steenblik

FOREIGN PATENT DOCUMENTS

DE      102012211077 A1    1/2014
WO      WO2005052650 A2    6/2005
WO      WO20050106601 A2   11/2005

OTHER PUBLICATIONS

PCT/EP2015/055280, International Search Report, dated May 21, 2015, European Patent Office, P.B. 5818 Patentlaan 2 NL-2280 HV Rijawijk.
(Continued)

Primary Examiner — Karl D Frech
(74) Attorney, Agent, or Firm — The Jansson Firm; Pehr B. Jansson

(57) ABSTRACT

The present invention relates to a data carrier, especially a security document, such as an identification card, e.g. a passport or a driving license, a credit card and a bank card, the data carrier comprising authentication data comprising personalized data, and as a security feature, an array of lenticular elements being arranged to provide only from predetermined angles of view an image of at least a piece of authentication data of said authentication data. In or to make the data carrier impossible or at least very difficult to copy and forge, the array of lenticular elements is provided with a complex structure providing a further security feature.

20 Claims, 2 Drawing Sheets

(51) Int. Cl.
  *G06K 19/10*  (2006.01)
  *B42D 25/309*  (2014.01)
  *B42D 25/324*  (2014.01)
  *B42D 25/342*  (2014.01)
  *B42D 25/313*  (2014.01)
  *G07D 7/00*  (2016.01)

(52) U.S. Cl.
  CPC ......... *B42D 25/324* (2014.10); *B42D 25/342* (2014.10); *G06K 19/10* (2013.01); *G07D 7/00* (2013.01)

(58) Field of Classification Search
  USPC ............ 25/380; 235/487, 380; 359/820, 619
  See application file for complete search history.

(56) References Cited

OTHER PUBLICATIONS

PCT/EP2015/055280, Written Opinion of the International Searching Authority, dated May 21, 2015, European Patent Office, D-80298 Munich.

\* cited by examiner

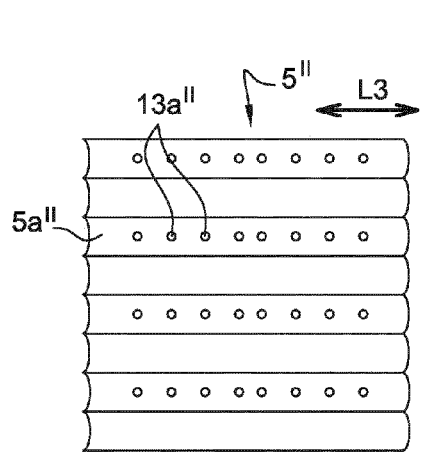
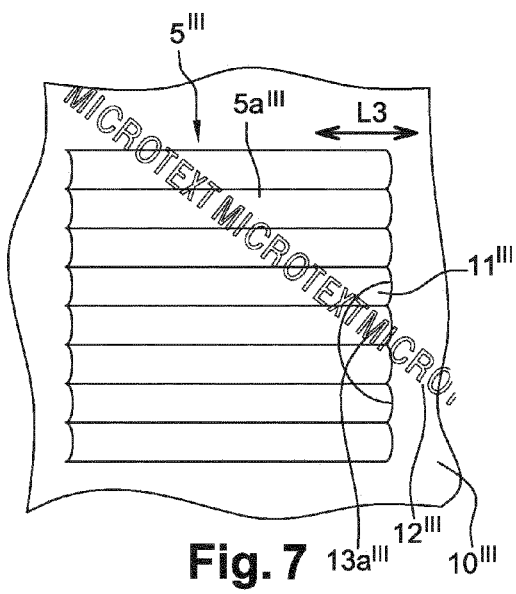
Fig. 6  Fig. 7
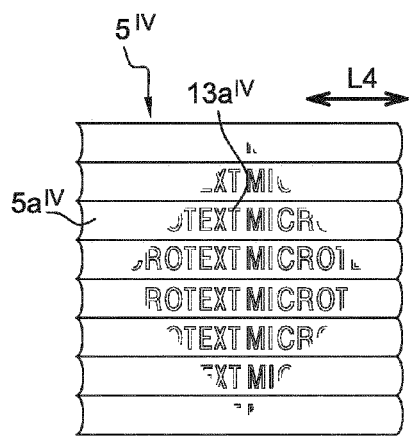
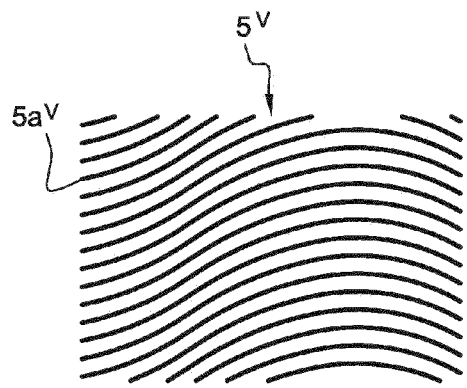
Fig. 8  Fig. 9
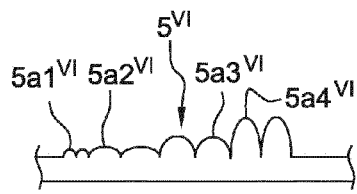
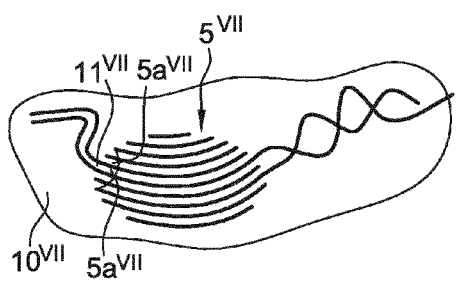
Fig. 10  Fig. 11

DATA CARRIER

FIELD OF THE INVENTION

The present invention relates to security features found in data carriers, such as security documents. More specifically the present invention relates to a data carrier, especially a security document, such as an identification card, e.g. a passport or a driving license, a credit card and a bank card, the data carrier comprising authentication data comprising personalized data, and as a security feature, an array of lenticular elements being arranged to provide only from predetermined angles of view an image of at least a piece of authentication data of said authentication data. The lenticular elements can also be called lenticular lenses.

BACKGROUND FOR THE INVENTION

Data carriers, such as identification cards and credit cards are commonly and increasingly used for various purposes. Due to their function to provide identity, they should offer great security against counterfeiting. Despite the requirement that the data carriers should be impossible or at least very difficult to forge, they should be suitable for mass production. A problem is, that data carriers are sometimes relatively easy to forge by different techniques. For instance, the genuine array of lenticular elements can be cut off (e.g. by knife) from an authentic data carrier and be transferred to another data carrier to produce authentic images in said another data carrier to provide incorrect identification. Data carriers have also been forged by mimicking in the forged data carrier the genuine array of lenticular elements of an authentic data carrier. In the forged data carrier the genuine array of lenticular elements has been mimicked with a similar looking lens array taken from commercial items such as toys and greeting cards.

BRIEF DISCLOSURE OF THE INVENTION

It is the aim of the present invention to provide a data carrier which is of a type that is, in practice, impossible or at least very difficult to forge. The data carrier of the present invention is characterized in that the array of lenticular elements is provided with a complex structure providing a further security feature The meaning of the expression complex structure is a general term for defining structures of the different embodiments of the invention disclosed herein. Generally one could explain said expression to denote a structure which does not follow the well known regular and simple pattern which is comprised of a number of identical, straight and parallel lenticular elements arranged side by side, neither a simple regular pattern formed of identical microlenses each having spherical, squared, or honeycomb design.

An essential idea of the invention is to modify an ordinary type array of lenticular elements used in prior art data carriers to form a further security feature.

Preferably, the complex structure is in the form of a marking made to at least one of the lenticular elements of the array of lenticular elements, whereby the marking preferably is in the form of a microstructure identifiable with a loupe or a microstructure. As the type and details of a microstructure on the array of lenticular elements may hugely vary, it is inherently cumbersome to copy. In order to prevent transfer of genuine array of lenticular elements of an authentic data carrier to a fake data carrier and to enable easy checking whether a genuine array of lenticular elements has been transferred to a fake data carrier, in the authentic data carrier a surface area of the data carrier outside and immediately surrounding an area of the array of lenticular elements is provided with a marking forming a continuation to the marking in the at least one lenticular element so that the marking in said surface area surrounding said area of the array of lenticular elements combines to the marking made to the at least one lenticular element.

Alternatively, or in addition, the further security feature comprises a complex structure in the form of a macroscopic shaping of lenticular elements of the array of lenticular elements, said macroscopic shaping being formed of a plurality of lenticular elements forming lines which differentiate from straight lines and which together exhibit a macroscopic effect visible to a naked eye. Such macroscopic shaping is difficult to copy, mimic, reproduce etc. Such macroscopic shaping may additionally comprise a marking, e.g. a micro sized marking, made to at least one of the lenticular element, which makes the data carrier even more difficult to copy. Preferably, the array of such lenticular elements and the shapes of the individual lenticular elements of the array of lenticular elements are designed to provide a focal length which focuses the light to the same depth on said at least one piece of authentication data below the array of lenticular elements. Such a design of the lenticular elements provides a good quality and sharp image of said at least one piece of authentication data, which typically is a text and/or numbers, or a photograph, and which is visible by the naked eye.

Preferred embodiments of the invention are presented in the attached dependent claims.

The advantages of the data carrier according to the invention is that it is difficult to forge and typically provides for a more safe data card that prior art data cards with an array of lenticular elements. The data carrier of the invention can be called a high security data carrier or a high security document. Preferred embodiments of the invention provide for a data carrier including well hidden security features which cannot be identified by a naked eye. The data carrier of the invention may contain a plurality of security features according to the different embodiments of the invention, which provides for a very high security level.

BRIEF DESCRIPTION OF THE DRAWINGS

The invention will be described with reference to the accompanying drawing in which FIG. 6 illustrates a third variant of the array of lenticular elements which can be found on the identification card of FIG. 1, FIG. 7 illustrates a fourth variant of the array of lenticular elements which can be found on the identification card of FIG. 1, FIG. 8 illustrates a fifth variant of the array of lenticular elements which can be found on the identification card of FIG. 1, FIG. 9 illustrates a sixth variant of the array of lenticular elements which can be found on the identification card of FIG. 1, FIG. 10 illustrates shaping of the cross section of the lenticular elements, and FIG. 11 illustrates a variant of the embodiment shown in FIG. 7.

DETAILED DESCRIPTION OF THE INVENTION

Figure 1:
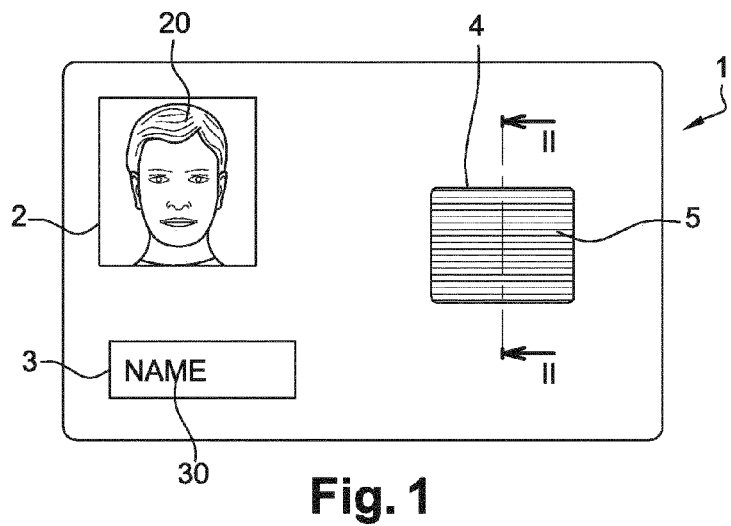
FIG. 1 shows a data carrier in the form or an identification card comprising an array of lenticular elements.

FIG. 1 shows a data carrier in the form of an identification card 1. The identification card 1 includes in sub-area 2 thereof a portrait, as a piece of authentication data 20 in the form of personalized data. Sub-area 3 of the identification card contains, as a further (second) piece of authentication data 30, personalized data, typically at least the name of the person shown in portrait.

Sub-area 4 contains an array of lenticular elements 5 (lenticular lenses) defining a planar plane which is in parallel with a plane defined by the identification card 1. Sub-area 4 contains, as a further piece of authentication data 60 (see FIGS. 2 and 3) of the identification card one or more images which can be seen with a naked eye, i.e. macro images. These images may provide personalized data, e.g. date of birth of the person shown in the portrait in sub-area 2. The personalized data in sub-area 4 can also be a mini portrait, i.e. a small size portrait of the person shown in the portrait in sub-area 2.

Figure 2:
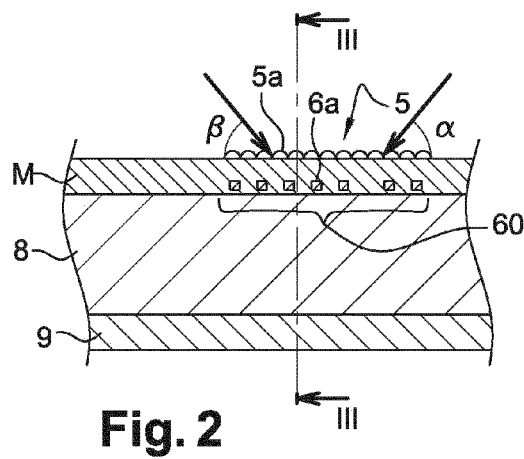
FIG. 2 shows a magnified section taken along line II-II of FIG. 1.
Figure 3:
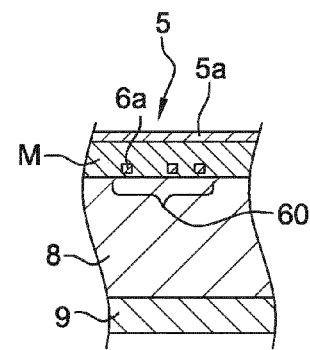
FIG. 3 illustrates a section taken along line III-III of FIG. 2.

The array of lenticular elements 5 is a changeable laser image array (CLI). Owing to the characteristics of the array of lenticular elements 5, said personalized data (or other authentication data) contained in sub-area 4 (i.e. the date of birth and/or the mini portrait) can be identified only from predetermined angles to the plane of the array of lenticular elements, c.f., for instance, angle α in FIG. 2. Thus, from angle α one can identify e.g. the date of birth, and from angle β one can see the mini portrait. The array or lenticular elements may be personalized also from more than two angles, and/or the images/micro images made from different angles may together form other effects such as animation, magnification, 3D imagery, and others known from Moiré lenses. In FIGS. 2 and 3 the further piece of authentication data 60 comprises a plurality of micro images 6a which together form the personalized data in the form of one or more macro images (said identification of date of birth and said mini portrait) found in sub area 4 of the identification card. The authentication data 60 below the array of lenticular elements 5 can be produced in many different ways; instead of producing it by laser, it can be produced e.g. by embossing, engraving and printing (e.g. offset-printing).

Said personalized data cannot be seen from an angle perpendicular to the plane of the array of lenticular elements. Thus, a Xerox-copy cannot, at least properly, capture or reproduce the authentication data contained in the sub-area 4. Owing to this, the array of lenticular elements 5, provides, as such, a security feature to the identification card. This security feature is commonly known from identification documents. The manufacturing methods of the identification card and especially the detailed steps of the manufacturing methods of the identification card are not explained here, because they are well known to a person skilled in the art. The basic manufacturing methods include a lamination process, or alternatively, hot stamping the lens profile with a die casting tool having the lens profile of the lenticular elements prepared to its surface. Several companies provide lamination plates with the CLI feature.

In FIGS. 2 and 3 reference sign 7 indicates a transparent upper layer 7 onto which the array of lenticular elements 5 is arranged. Reference sign 5a illustrates a single lenticular element in the array of lenticular elements 5. From FIG. 3 one can see that the lenticular element 5a is a longitudinal lens. Reference numeral 8 designates a non-transparent, e.g. white, or semitransparent core. The core 8 can alternatively in its entirety, or at only some parts of the data carrier be translucent. The array of lenticular elements can be located at said parts of the data carrier. In such cases the lenticular image need not necessarily be produced by laser printing, but e.g. by thermal transfer printing. The core may comprise one or more layers which all can be white. Alternatively, one or more, or even all of the layers can be transparent plastic layers. One or more of the core layers may contain electronic components (e.g. a contact free microchip and an antenna). Reference numeral 9 is drawn to a transparent bottom layer. The upper layer 7, the core 8 and the bottom layer 9 are preferably made of polycarbonate (PC). Alternatively, they can be made of polyvinylchloride (PVC). It is possible to use other materials than these; e.g. polyethylene terephthalate (PET). The core 8 can be of a material having the trade mark TESLIN (manufactured by PPG Industries). Teslin is an extremely strong recyclable material used in e.g. driver's licenses. The core can also be paper. A material having the trade mark TRITAN (manufactured by Eastman Chemical Company), can also be used. Tritan has similar properties as polyester and tools for polyester can be used for Tritan.

Figure 4:
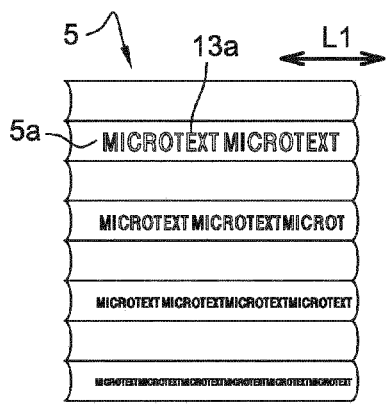
FIG. 4 illustrates a first variant of the array of lenticular elements which can be found on the identification card of FIG. 1.

FIG. 4 illustrates one embodiment of the array of lenticular elements 5 which can be used in the identification card 1 of FIG. 1. The array of lenticular elements 5 is provided with a complex structure by adding to some of the lenticular elements, e.g. on lenticular element 5a, a marking 13a in the form of a microstructure which cannot be identified with the naked eye but which can be identified with a loupe or a microscope. More specifically the microstructure comprises a marking 13a in the form of a micro text. The size of a single letter can preferably be within the range 50 to 150 μm. However, the range can be broader, e.g. from 10 μm to 500 μm, or even between 10 μm and 2 mm. Alternatively, or in addition, the microstructure can be digits or any arbitrary code. In the figure, distance L1 is 500 μm.

Said micro text or micro texture provides a further security feature to the identification card 1. As the microstructure cannot be seen at all with the naked eye, a forged identification card which has been copied without the knowledge of the microstructure (e.g. the micro text) can be identified as a false one when comparing it, utilizing a microscope, with a genuine identification card. Further, even if one tried to copy the complex structure, e.g. the micro text, it would be very difficult to copy owing to the complicated manufacturing technology and manufacturing apparatus to be used. The micro text (or other complex structure) can preferably be manufactured utilizing a picosecond laser engraving setup by providing high power, small spot size laser ablation to a lamination plate (not shown). More specifically, a preferred manufacturing process is a combination of originating the shape of the lenticular element including the microstructure and then replicating this shape onto the plastic surface of the data carrier. The shape origination is preferably done using laser ablation of a metal surface using a setup with high power and small laser spot size. A preferable example of the laser used in such a setup is a picosecond laser. When manufacturing the identification card, the shape of the micro text is by a lamination process transferred from the lamination plate to the lenticular elements. Embossing may typically be used to laminate the upper layer 7 to the core 8. The lamination of the upper layer 7 to the core 8 takes preferably place at the same as the upper layer 7 is furnished with the array of lenticular elements.

Alternatively, the following manufacturing techniques can be used for manufacturing of the micro text (or other complex structure) to the lamination plate: mechanical milling, galvanic process, lithography, material addition and direct printing. However, the most preferable manufacturing method is laser ablation.

Figure 5:
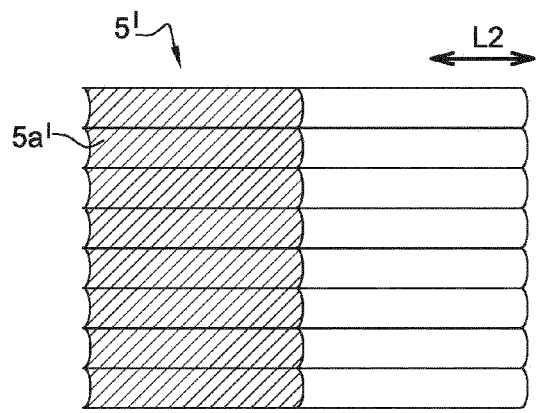
FIG. 5 illustrates a second variant of the array of lenticular elements which can be found on the identification card of FIG. 1.

FIG. 5 illustrates a second type of marking 13a' which can be applied to the array of lenticular elements 5'. In FIG. 5 the lenticular elements 5a' have been furnished with a marking 13a' in the form of a microstructure, which is in the form of a texture. The texture shown in FIG. 5 comprises a plurality of oblique lines forming an angle to the longitudinal direction of the lenticular elements 5a'. Distance L2 is 500 µm.

FIG. 6 illustrates, as an example, a further type of marking 13a'' which can be applied to the lenticular elements 5a''. In FIG. 6 the lenticular elements 5a'' have been furnished with a marking 13a'' in the form of a microstructure comprising one or more series of dots. The size of a single dot is only e.g. 1 to 2 µm. The dots do not, in practice, change at all the optical properties of the lenticular element 5a''. The dots could be called as deliberate errors, and may provide for very high security level; $3^{rd}$ and $4^{th}$ level (Forensic) security feature can be achieved. In FIG. 6, the distance L3 is 100 µm.

FIG. 7 illustrates a further type of marking 13a''' made to the array of lenticular elements 5'''. In FIG. 7 a surface area 10''' of the data carrier outside and immediately surrounding an area 11''' of the array of lenticular elements 5''' is provided with a marking 12''' forming a continuation to the marking 13a''' made to the array of lenticular elements 5''', so that the marking 12''' in said surface area 10''' combines to the marking 13a''' made to the array of lenticular elements 5'''. The markings 13a''' and 12''' are in the form of a microstructure, e.g. a micro text. The embodiment of FIG. 7 provides safety especially against such forgery which is based on cutting out only the array of lenticular elements 5''' from an authentic identification card 1 and transferring it to a false one. If such an array of lenticular elements 5''', which has been cut out, was implemented to a false card having no marking (c.f. marking 12''') in an surrounding area (c.f. area 10''') one can easily detect the false identification card by e.g. a loupe or even by a naked eye—depending on the size of the markings. In FIG. 7 the marking 12''' may extend on a major area of the identification card, even up to the outer periphery thereof. It should be noted that FIG. 7 illustrates only one of many ways to fade out a border between an array of lenticular elements and an area of data carrier, surrounding the array of lenticular elements.

FIG. 8 illustrates a further type of marking $13a^{IV}$ made to the array of lenticular elements $5^{IV}$. In FIG. 8 the marking $13a^{IV}$ extends on a plurality of the lenticular elements $5a^{IV}$ and exhibits a macroscopic effect or a macroscopic image visible to a naked eye. In FIG. 8, the macroscopic effect has a shape resembling a square, but the macroscopic effect could, in principle be any shape. In FIG. 8, the distance L4 is 500 µm. The embodiment in FIG. 8 is very advantageous, because one can quickly identify with the naked eye the macroscopic effect (a square), and if one wishes to study in more detail the marking with a loupe or a microscope in order to verify the authenticity of the identification card, one can check the microstructure, i.e. the micro text, code or texture, forming the macroscopic effect.

FIG. 9 illustrates a further type of complex structure which can be made to the data carrier. In FIG. 9 the complex structure comprises a macroscopic shaping of the lenticular elements $5a^V$ in the array of lenticular elements $5^V$. The macroscopic shaping is formed of a plurality of lenticular elements $5a^V$ forming lines which differentiate from straight lines and which exhibit a macroscopic effect visible to a naked eye. In FIG. 9 the macroscopic effect is a wavy pattern. Alternatively, the macroscopic effect could be e.g. a zig-zag pattern or a simple bending/curving of the lenticular elements.

Preferably the array of lenticular elements $5^V$ and the shapes of the individual lenticular elements $5a^V$ in FIG. 9 are designed to provide a focal length which focuses the light to the same depth on said at least one piece of authentication data 60 (not specifically shown in the drawing) below the array of lenticular elements. Such a design of the lenticular elements provides a good quality and sharp image of said at least one piece of authentication data 60, which typically is a text and/or numbers, or a photograph or a finger print, and which is visible by the naked eye.

The complex structure formed of a plurality of lenticular elements may reflect light in different angles in such a way that the macroscopic shaping generates recognizable shapes such as logos and national emblems (not shown in the drawings).

FIG. 10 shows a cross section of an embodiment of the array of lenticular elements $5^{VI}$. As seen from the figure, the cross section of the lenticular elements $5a^{VI}$, $5a2^{VI}$, $5a3^{VI}$ and $5a4^{VI}$ varies, i.e. the cross section has different geometry. The curvature and/or the radius of the lenticular elements $5a1^{VI}$, $5a2^{VI}$, $5a3^{VI}$ and $5a4^{VI}$ within the same array of lenticular elements $5^{VI}$ may thus vary. Also in this embodiment, the array of lenticular elements $5^{VI}$ and the shapes of the individual lenticular elements $5a^{VI}$, $5a2^{VI}$, $5a3^{VI}$ and $5a4^{VI}$ are designed to provide a focal length which focuses the light to the same depth on at least one piece of authentication data (not shown in FIG. 10; c.f. authentication data 60 in FIG. 2) below the array of lenticular elements. The curvature of the lenticular element $5a3^{VI}$ differs from the curvature of the lenticular element $5a2^{VI}$. Also, the radius of the lenticular elements $5a1^{VI}$, $5a2^{VI}$, $5a3^{VI}$ and $5a4^{VI}$ can vary. E.g. the radius of the lenticular element $5a2^{VI}$ differs from the radius of the lenticular element $5a1^{VI}$. Thus, a complex structure of the array of lenticular elements $5^{VI}$ can be achieved by having within the same array lenticular elements $5a1^{VI}$, $5a2^{VI}$, $5a3^{VI}$ and $5a4^{VI}$ having different geometry.

The lenticular elements $5a1^{VI}$, $5a2^{VI}$, $5a3^{VI}$ and $5a4^{VI}$ of FIG. 10 can still further have a complex structure in the form of a microstructure of the kind described above, i.e. a marking in the form of a micro text, a code, a texture, dots and/or macroscopic shaping.

In FIG. 11 is shown another way than in FIG. 7 of fading out a border between an array of lenticular elements and a surrounding area of the data carrier. In FIG. 11, which like FIG. 9 comprises a macroscopic shaping of the lenticular elements in the array of lenticular elements $5^{VII}$, one or more of the lenticular elements $5a^{VII}$ extend to the surface area $10^{VII}$ which surrounds the area $11^{VII}$ of the array of lenticular elements $5^{VII}$. The profile of the lenticular elements $5a^{VII}$ can be modified, and they can be made to merge into a surrounding surface relief pattern. One or more of the lenticular elements can further be provided with marking in the form of a microstructure (not shown in FIG. 11; c.f. microstructure in FIG. 7).

The invention has been disclosed above with reference to a number of examples constituting preferable embodiments of the invention. It should be noted that the invention can be realized in many different manners within the scope of the claims. For example, the microstructure (when present) can be added onto the surface of the lenticular elements providing thus an embossed microsturcture (micro text, micro digits a code, a texture, dots) or alternatively the microstructure can be added as an engraving (recesses) in the surface of the lenticular elements. The microstructure in the same array of lenticular elements may also contain both embossings and engravings. Further, the array of lenticular elements can be designed to provide an image of the personalized (or other authentication data) data when looking at the array of lenticular elements in a direction which is perpendicular to the plane defined by the array of lenticular elements. When looking at such an array of lenticular elements from a direction which deviates from said perpendicular direction, the personalized data (or other authentication data) cannot be seen. The number of sub-areas in the data carrier may vary; in principle only one sub-area could for some applications provide for enough security.

The invention claimed is:

1. A data carrier, especially a security document, such as an identification card, e.g. a passport or a driving license, a credit card and a bank card, the data carrier comprising authentication data comprising personalized data, and further comprising as a security feature, an array of lenticular elements being arranged to provide only from predetermined angles of view an image of at least a piece of authentication data of said authentication data, the array of lenticular elements is provided with a complex structure providing a further security feature.

2. The data carrier according to claim 1, wherein the complex structure is in the form of a marking made to at least one of the lenticular elements of the array of lenticular elements.

3. The data carrier according to claim 2, wherein the marking is in the form of a microstructure identifiable with a loupe or a microscope.

4. The data carrier according to claim 3, wherein the marking is in the form of a micro text, a code or a texture.

5. The data carrier according to claim 3, wherein the marking extends on plurality of the lenticular elements of the array of lenticular elements and forms a line.

6. The data carrier according to claim 3, wherein a surface area of the data carrier outside and immediately surrounding an area of the array of lenticular elements is provided with a marking forming a continuation to the marking in the at least one lenticular element so that the marking in said surface area surrounding said area of the array of lenticular elements combines to the marking made to the at least one lenticular element.

7. The data carrier according to claim 2, wherein the marking is in the form of a micro text, a code or a texture.

8. The data carrier according to claim 2, wherein the marking extends on plurality of the lenticular elements of the array of lenticular elements and forms a line.

9. The data carrier according to claim 2, wherein a surface area of the data carrier outside and immediately surrounding an area of the array of lenticular elements is provided with a marking forming a continuation to the marking in the at least one lenticular element so that the marking in said surface area surrounding said area of the array of lenticular elements combines to the marking made to the at least one lenticular element.

10. The data carrier according to claim 2, wherein the marking extends on a plurality of the lenticular elements and exhibits a macroscopic effect visible to a naked eye.

11. The data carrier according to claim 2, wherein the marking extends on a plurality of the lenticular elements and exhibits a macroscopic effect visible to a naked eye.

12. The data carrier according to claim 1, wherein the complex structure comprises a macroscopic shaping being formed of a plurality of lenticular elements forming lines which differentiate from straight lines and which together exhibit a macroscopic effect visible to a naked eye.

13. The data carrier according to claim 12, wherein said lines are curved or exhibit a zig-zag pattern.

14. The data carrier according to claim 13, wherein the array of lenticular elements and the shapes of the individual lenticular elements are designed to provide a focal length which focuses the light to the same depth on said at least one piece of authentication data below the array of lenticular elements.

15. The data carrier according to claim 12, wherein the array of lenticular elements and the shapes of the individual lenticular elements are designed to provide a focal length which focuses the light to the same depth on said at least one piece of authentication data below the array of lenticular elements.

16. The data carrier according to claim 1, wherein the complex structure comprises a macroscopic shaping being formed of a plurality of lenticular elements reflecting light in different angles which together exhibit a macroscopic effect in the form of a recognizable shape visible to a naked eye.

17. The data carrier according to claim 16, wherein the recognizable shape is in the form of a logo or a national emblem.

18. A data carrier according to claim 1, wherein the complex structure comprises the array of lenticular elements where the cross section of the lenticular elements different geometry.

19. The data carrier in the form of a security document according to claim 1, wherein the security document is in the form of a card comprising a core and a transparent upper layer attached to the core, the transparent layer comprising said array of lenticular elements.

20. The data carrier according to claim 19, wherein the upper layer comprises said at least one piece of authentication data being visible by a naked eye and being formed of a plurality of micro images.

* * * * *